United States Patent
Kremer et al.

(10) Patent No.: US 9,334,995 B2
(45) Date of Patent: May 10, 2016

(54) SINGLE LOCK AND DOUBLE LOCK COUPLINGS HAVING A LOCKING RING WITH IDENTIFYING INDICIA AND METHODS OF USE AND ASSEMBLY

(71) Applicant: CAMPBELL FITTINGS, INC., Boyertown, PA (US)

(72) Inventors: Randi Kremer, Barto, PA (US); Eric Schrack, Hamburg, PA (US); Josh Leofsky, Hamburg, PA (US); Thomas Paff, Valley Forge, PA (US)

(73) Assignee: CAMPBELL FITTINGS, INC., Boyertown, PA (US)

( * ) Notice: Subject to any disclaimer, the term of this patent is extended or adjusted under 35 U.S.C. 154(b) by 120 days.

(21) Appl. No.: 14/075,181

(22) Filed: Nov. 8, 2013

(65) Prior Publication Data

US 2015/0130181 A1 May 14, 2015

(51) Int. Cl.
*F16L 37/248* (2006.01)

(52) U.S. Cl.
CPC ........... *F16L 37/248* (2013.01); *F16L 2201/20* (2013.01); *F16L 2201/60* (2013.01); *Y10T 29/49428* (2015.01)

(58) Field of Classification Search
CPC ..... F16L 37/252; F16L 37/242; F16L 37/248; F16L 37/107; F16L 37/24; F16L 37/244; F16L 21/08; F16L 37/0841; F16L 37/22
USPC ........ 285/86, 361, 330, 316, 401, 402, 65, 66
See application file for complete search history.

(56) References Cited

U.S. PATENT DOCUMENTS

| 1,093,528 | A |   | 4/1914  | Bowes |
|-----------|---|---|---------|-------|
| 1,303,367 | A |   | 5/1919  | Nelson |
| 1,885,321 | A | * | 11/1932 | Benn ..................... F16L 37/248 285/331 |
| 2,924,949 | A |   | 2/1960  | Smith |
| 4,344,455 | A |   | 8/1982  | Norton et al. |
| 4,611,485 | A | * | 9/1986  | Leslie ............................ 73/49.8 |
| 4,660,803 | A | * | 4/1987  | Johnston et al. .......... 251/149.1 |
| 5,138,784 | A |   | 8/1992  | Niwa |
| 5,184,851 | A | * | 2/1993  | Sparling ............... F16L 37/252 285/314 |
| 5,192,219 | A | * | 3/1993  | Fowler et al. ................. 439/321 |
| 5,342,099 | A |   | 8/1994  | Bahner et al. |

(Continued)

FOREIGN PATENT DOCUMENTS

| CN | 202660128 U    | 1/2013 |
| DE | 20 2011 004 364 U1 | 5/2011 |
| EP | 0 372 373 A2   | 6/1990 |

*Primary Examiner* — Daniel P Stodola
*Assistant Examiner* — Zachary Dragicevich
(74) *Attorney, Agent, or Firm* — RatnerPrestia

(57) ABSTRACT

Couplings for use with mating couplings with locking rings. A stem coupling may have a coupling head configured to attach with a head portion of the mating coupling, a stem mated to the coupling head where the stem has a threaded portion on an outer surface, and a retractable locking sleeve positioned on a portion of the coupling head. The retractable locking sleeve may have a locked position and an unlocked position for preventing and permitting the coupling head to attach to or detach from the mating coupling. The stem coupling includes a stem locking ring having a first position preventing axial movement of the locking sleeve and a second position permitting axial movement of the locking sleeve. The stem locking ring may also include at least one of a color and indicia to alert a user to a type of media for which the stem coupling is intended.

12 Claims, 7 Drawing Sheets

(56) References Cited

U.S. PATENT DOCUMENTS

| | | | |
|---|---|---|---|
| 5,785,545 A * | 7/1998 | Holt | H01R 13/62 439/321 |
| 5,971,019 A | 10/1999 | Imai | |
| 5,988,693 A | 11/1999 | Street | |
| 2004/0016190 A1 * | 1/2004 | Radke et al. | 52/232 |
| 2004/0238777 A1 * | 12/2004 | Yang | 251/149.6 |
| 2006/0082148 A1 | 4/2006 | Durieux et al. | |
| 2007/0257484 A1 | 11/2007 | Schindel | |
| 2009/0078322 A1 | 3/2009 | Thomas et al. | |
| 2009/0236851 A1 * | 9/2009 | Hampel et al. | 285/403 |
| 2010/0276924 A1 | 11/2010 | Gillet et al. | |
| 2011/0121561 A1 * | 5/2011 | Wang | F16L 37/133 285/148.2 |

* cited by examiner

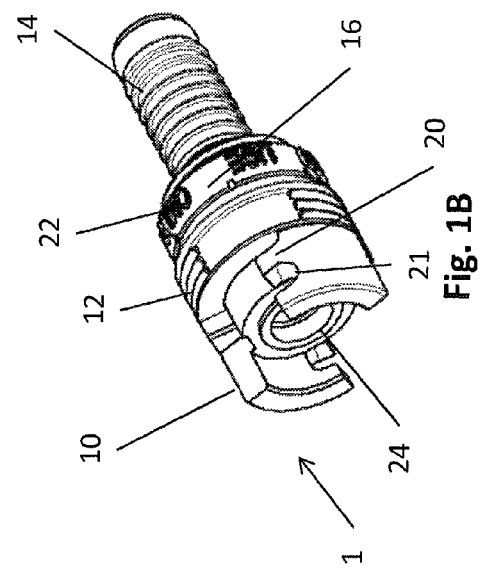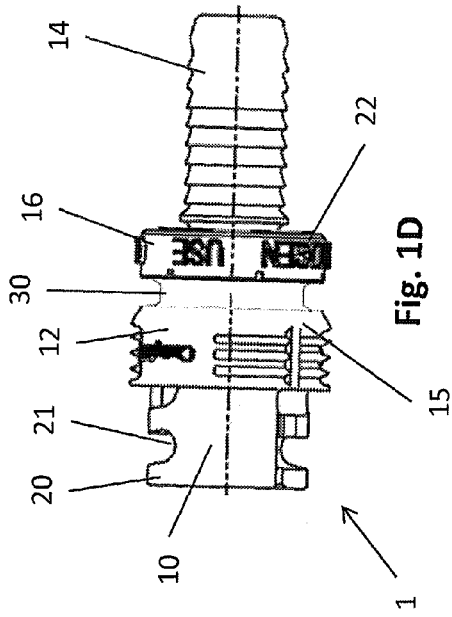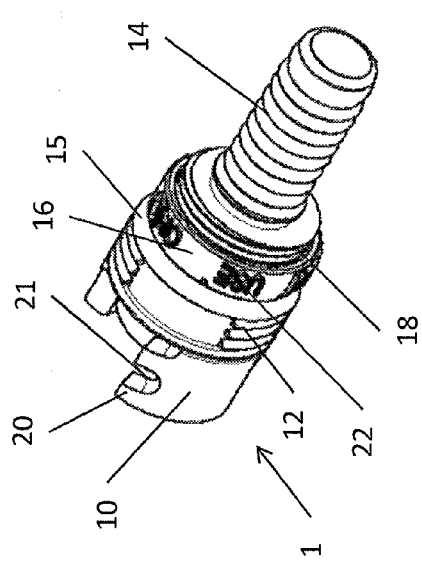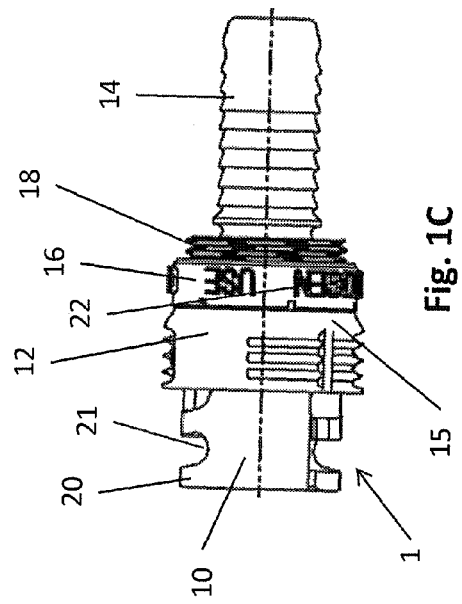

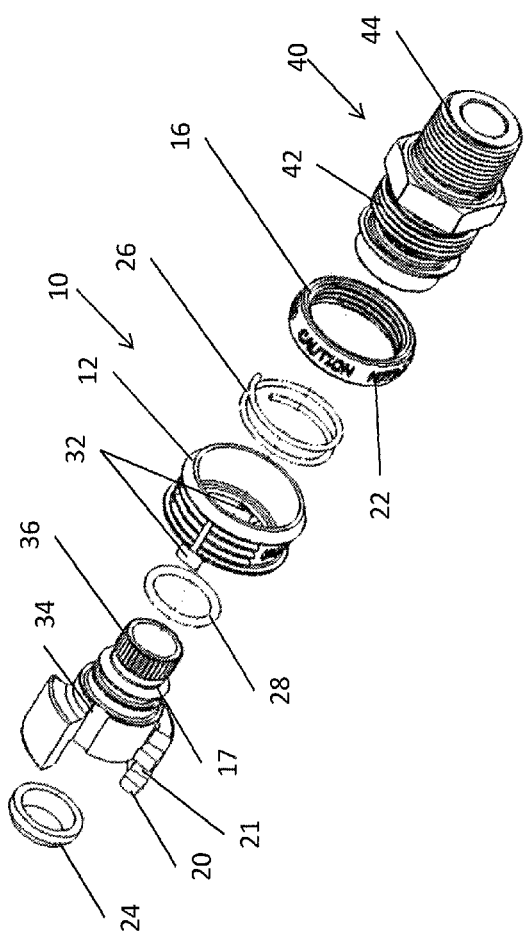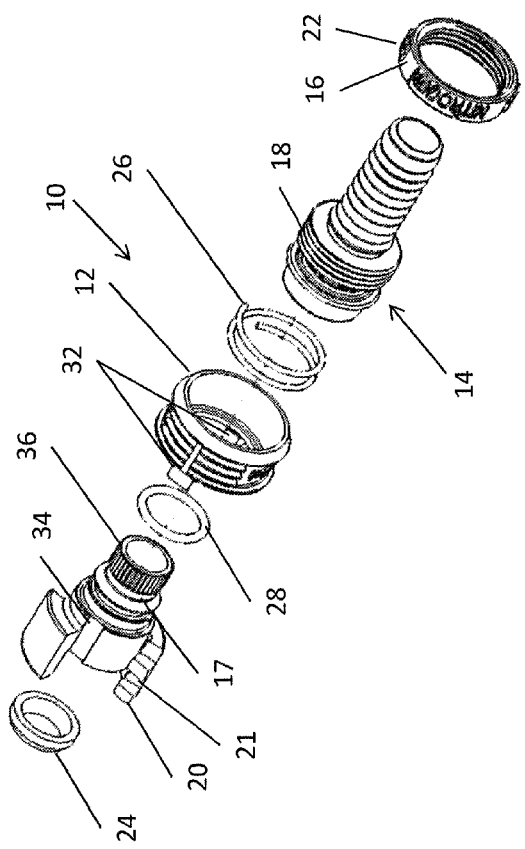

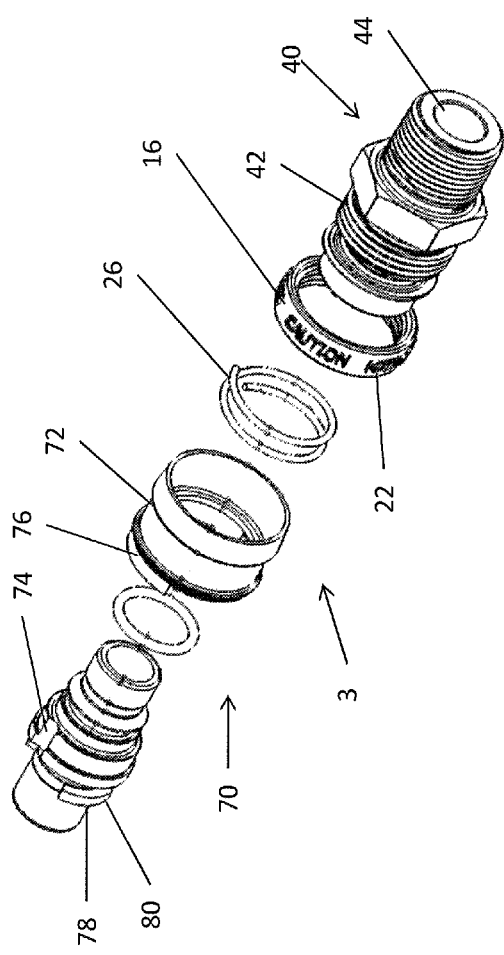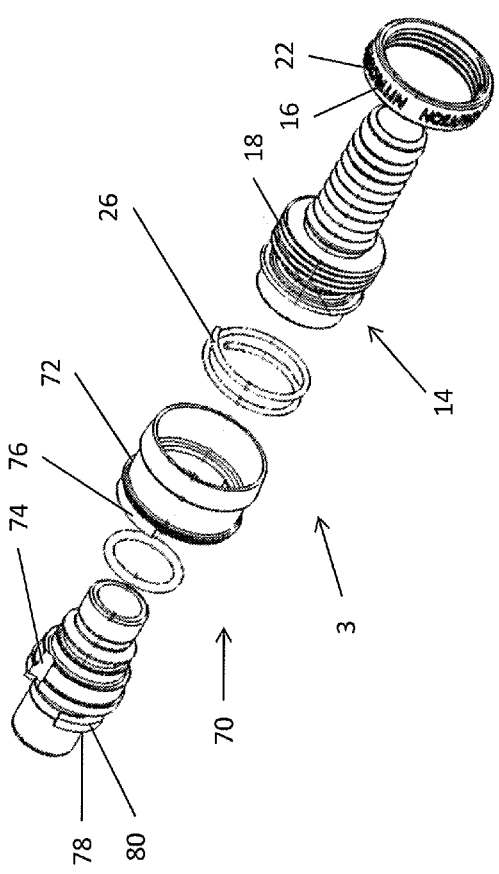

SINGLE LOCK AND DOUBLE LOCK COUPLINGS HAVING A LOCKING RING WITH IDENTIFYING INDICIA AND METHODS OF USE AND ASSEMBLY

FIELD OF THE INVENTION

The present invention relates to locking mechanisms for hose couplings.

BACKGROUND OF THE INVENTION

Couplings are used to distribute various media, such as liquid or gas. Exposure to an incorrect media can be harmful or even deadly. To prevent exposure to incorrect media there is a need for reliable locking mechanisms and labeling systems for couplings.

SUMMARY OF THE INVENTION

Aspects of the invention are embodied in stem couplings for use with a mating coupling. The stem coupling may have a coupling head configured to attach with a head portion of the mating coupling, a stem mated to the coupling head where the stem has a threaded portion on an outer surface, and a retractable locking sleeve positioned on a portion of the coupling head. The retractable locking sleeve may have a locked position preventing the coupling head from attaching to or detaching from the mating coupling and an unlocked position permitting the coupling head to attach to or detach from the mating coupling. The stem coupling may further include a stem locking ring threadedly connected to the threaded portion of the stem. The stem locking ring may have a first position preventing axial movement of the locking sleeve and a second position permitting axial movement of the locking sleeve. The stem locking ring may also include at least one of a color and indicia to alert a user to a type of gas or liquid for which the stem coupling is intended.

Further aspects of the invention are embodied in methods of assembling stem couplings. The methods may include mating a coupling head to a stem, positioning a locking sleeve on the coupling head, and threadedly connecting a stem locking ring to a threaded portion on the outer surface of the stem. The stem locking ring may have a first position preventing axial movement of the locking sleeve and a second position permitting axial movement of the locking sleeve. The stem locking ring may also include at least one of a color and indicia to alert a user to a type of gas or liquid for which the stem coupling is intended.

Even further aspects of the invention are embodied in methods for locking couplings to mating couplings. The methods may include retracting a locking sleeve in an axial direction from a coupling head, rotating the coupling head in a predetermined direction to engage the mating coupling, releasing the locking sleeve to place a first surface of the locking sleeve in contact with a rearward surface of the coupling head, and rotating a stem locking ring to place a first surface of the stem locking ring against a second surface of the locking sleeve. The stem locking ring may have a first position preventing axial movement of the locking sleeve and a second position permitting axial movement of the locking sleeve. The stem locking ring may also include at least one of a color and indicia to alert a user to a type of gas or liquid for which the stem coupling is intended.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. Included in the drawings are the following figures:

FIGS. 1A and 1B are isometric views of a hose style coupling according to aspects of the invention;

FIG. 1C is a side view of a hose style coupling according to aspects of the invention;

FIG. 1D is a side view of a hose style coupling with a locking ring in an unlocked position in accordance with aspects of the invention;

FIGS. 3A, 3B, and 3C are exploded isometric views of a coupling with several stem styles in accordance with aspects of the invention;

FIGS. 5A, 5B, and 5C are exploded isometric views of a single-lock style coupling with several stem styles, in accordance with aspects of the invention.

DETAILED DESCRIPTION OF THE INVENTION

Figure 2:
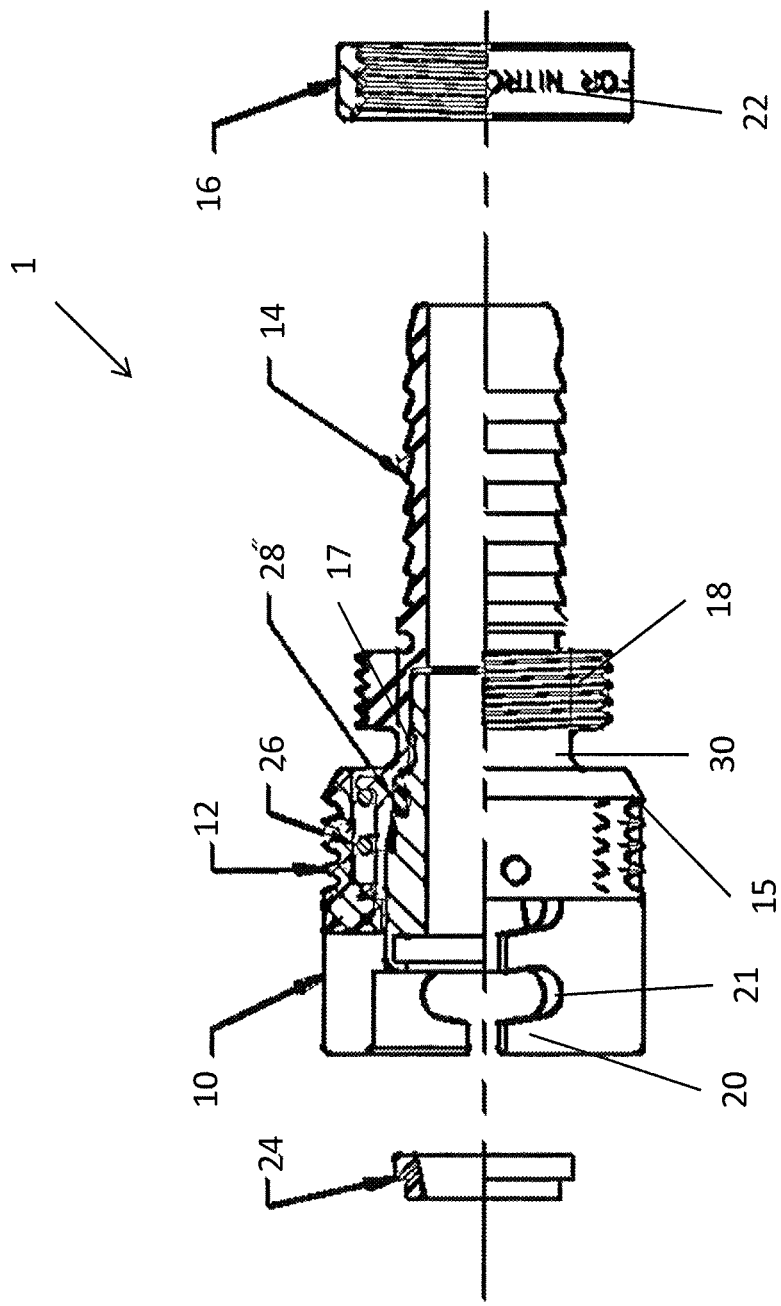
FIG. 2 is a bisected, partially exploded cross-sectional side view of a hose style coupling according to aspects of the invention.

FIGS. 1A-1D depict views of a coupling 1 with a stem locking ring 16 according to one embodiment of the invention. The coupling 1 includes a coupling head 10 that is attached to a stem 14. As depicted in FIGS. 1A-1D, the coupling 1 is a hose-style coupling and the stem 14 is a hose stem. In an exemplary embodiment, the coupling 1 is a manifold-style coupling and the stem 14 is a manifold configured to couple with a male and/or female National Pipe Thread (NPT) threaded coupling. The coupling 1 is adapted for use in a double-lock style coupling. In an alternative embodiment, the coupling 1 is adapted for use in a single-lock style coupling. The coupling head 10 is configured to attach with a head portion of a mating coupling (best shown as 60 in FIGS. 4A and 4B). The coupling head 10 may have formed in it ears 20 that are adapted to mate with respective recesses (similar to recesses 21 of the coupling head 10) formed in a mating coupling. In one embodiment, the coupling head 10 attaches and detaches with the head portion of the mating coupling by rotating the coupling head 10 such that the ears 20 move into and out of the respective recesses. The ears 20 may be configured according to a double locking coupling (i.e., Thor style), a single locking coupling (i.e., Bowes style), etc. Other suitable coupling heads and mating coupling configurations will be understood by one of skill in the art from the description herein.

The coupling head 10 includes a gasket 24. The gasket 24 may be a ring, washer, head gasket, etc. In one embodiment, the gasket 24 is positioned within the coupling head 10 to prevent leakage between the coupling head 10 and the mating coupling when the coupling head 10 and the mating coupling are attached.

A retractable locking sleeve 12 is positioned on a portion of the coupling head 10. The retractable locking sleeve 12 may also be positioned on a portion of the stem 14. Other suitable positions for the retractable locking sleeve will be understood by one of skill in the art from the description herein. The retractable locking sleeve 12 has a locked position and an unlocked position. The retractable locking sleeve 12 as shown is in the locked position in FIGS. 1A-1D. In the locked position, the retractable locking sleeve 12 prevents the coupling head 10 from attaching to and detaching from a mating coupling. In the unlocked position (where the locking sleeve 12 is spaced from the coupling head 10), the retractable locking sleeve 12 permits the coupling head 10 to attach to and detach from the mating coupling. In one embodiment, the retractable locking sleeve 12 is configured to move axially from the locked position to the unlocked position. Other suitable locking sleeves will be understood by one of skill in the art from the description herein.

A stem locking ring 16 is shown in FIGS. 1A-1C in a first position abutting the retractable locking sleeve 12 at a beveled surface 15 on the retractable locking sleeve 12. The stem locking ring 16 may cover a portion of the beveled surface 15. The stem locking ring 16 in the first position prevents the retractable locking sleeve 12 from moving axially to the unlocked position. The stem locking ring 16 in a second position, as shown in FIG. 1D, is spaced apart from the retractable locking sleeve 12 permitting the retractable locking sleeve to move axially to the unlocked position. In one embodiment, the stem locking ring 16 has internal threads (best shown in FIG. 3A-3C) adapted to threadedly connect to a threaded portion 18 on the outer surface of the stem 14. The stem locking ring 16 may be rotated in a predetermined direction to move axially to the first position abutting the retractable locking sleeve 12 or to the second position spaced apart from the retractable locking sleeve 12. In one embodiment, the stem locking ring 16 has left handed threads and the coupling head 10 or mating coupling is configured to rotate clockwise, thus rotation opposite in radial direction to the stem locking ring 16. In an alternative embodiment, the stem locking ring 16 has right handed threads and the coupling head 10 or mating coupling is configured to rotate counterclockwise, thus rotation opposite in radial direction to the stem locking ring 16.

The stem locking ring 16 may include indicia 22 on the outer surface to alert a user of the type of media for which the coupling 1 is intended. The media may be a gas and/or liquid. In one embodiment, the media is nitrogen. The indicia 22 may be in the form of text and/or symbols. The text and/or symbols may be molded, imprinted, and/or marked on the outer surface of the stem locking ring 16. In one embodiment, the stem locking ring 16 is of a color to alert a user of the type of media for which the coupling 1 is intended. The color may be at least one of red, orange, yellow, green, etc. In an embodiment, the color of the stem locking ring 16 is of a different color than the stem 14, retractable locking sleeve 12, and/or coupling head 10 to sufficiently alert a user of the media. The stem locking ring 16 may include both a color and an indicia for alerting a user. In an embodiment where the media is nitrogen, the stem locking ring 16 is yellow and includes the text "Nitrogen" on the outer surface. Other suitable colors and indicia for alerting a user of the media for which the coupling 1 is intended will be understood by one of skill in the art from the description herein.

The stem locking ring 16 may also include locking indicia to indicate the direction in which the stem locking ring 16 is to be rotated to move from the second position to the first position and vice versa. The locking indicia may be in the form of text and/or symbols. The text and/or symbols may be molded, imprinted, and/or marked on the outer surface of the stem locking ring 16. In an embodiment, the locking indicia is an arrow. In one embodiment, the locking indicia includes the text "lock" on the outer surface. Other suitable locking indicia will be understood by one of skill in the art from the description herein.

Referring next to FIG. 2, a partially exploded cross-sectional side view of the coupling 1 is shown in accordance with an embodiment of the invention. A staked portion 30 is displaced on the stem 14 into a groove 17 formed on the coupling head 10. The staked portion forms an interlock between the coupling head 10 and the stem 14 to counteract internal pressure. The staked portion 30 may be of a radius that is less than the radius of the threaded portion 18. In one embodiment, the stem locking ring 16 is disposed over the staked portion 30 when the stem locking ring 16 is in the first position.

A resilient element 26 is disposed within the retractable locking sleeve 12 to facilitate axial movement of the retractable locking sleeve 12 to and from the locked and unlocked positions. The resilient element 26 depresses when the retractable locking sleeve 12 moves from the locked position to the unlocked position and expands when the locking sleeve 12 moves from the unlocked position to the locked position. In one embodiment, the resilient element 26 is a spring. In a particular embodiment, the retractable locking sleeve 12 with the resilient element 26 is configured to move to the unlocked position when the mating coupling (not shown) is being attached to the coupling head 10. In attaching the mating coupling to the coupling head 10, the retractable locking sleeve 12 may be configured to move from the locked position to the unlocked position by pressing the mating coupling to the coupling head 10. One of skill in the art will understand other suitable resilient elements and locking sleeve configurations from the description herein.

A ring 28 is positioned between the coupling head 10 and the stem 14. The ring 28 may be adapted to seal pressure between the coupling head 10 and the stem 14. The ring 28 may be a gasket, washer, head gasket, etc. In one embodiment, the ring 28 is an O-ring. Other rings or mechanisms for sealing pressure between the coupling head 10 and the stem 14 will be understood by one of skill in the art.

Figure 3C:
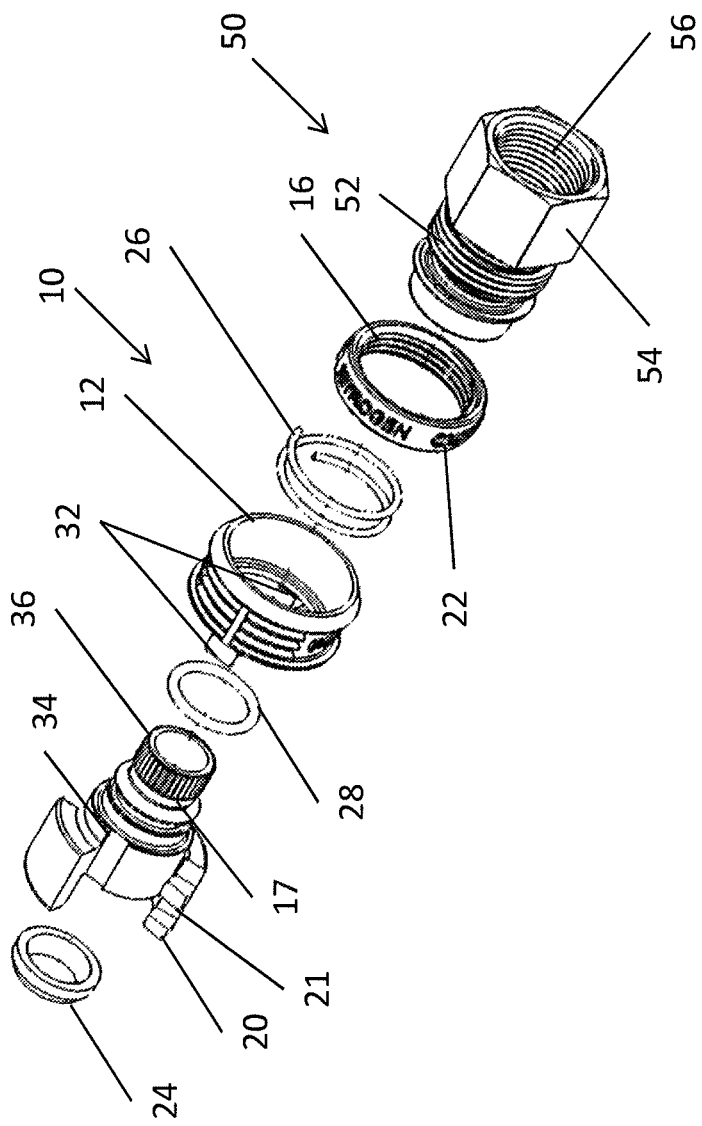

At FIGS. 3A-3C, isometric exploded views of a coupling 1 for use in a double-locking style coupling is shown. The coupling 1 includes a stem that may be a hose stem 14 and/or a manifold stem 40, 50. The manifold stem 40 has a threaded end 44 configured to couple with a female NPT threaded coupling. The manifold stem 50 includes an end 54 having an internal threaded portion 56 configured to couple with a male NPT threaded coupling. The hose stem 14 and manifold stems 40, 50 may have a threaded portion 18, 42, 52 on the outer surface configured to threadedly connect to the stem locking ring 16.

The retractable locking sleeve 12 includes axial projections 32 and the coupling head 10 includes axial channels 34. The axial projections 32 are disposed within the axial channels 34 when the retractable locking sleeve 12 is not in the unlocked position, thus preventing rotation of the coupling head 10 with respect to the mating coupling. The axial projections 32 slide axially outward from the axial channels 34 when the retractable locking sleeve 12 is moved from the locked position to the unlocked position. The axial projections 32 may be fully disposed or partially disposed within the axial channels 34 when the retractable locking sleeve 12 is in the locked position.

A knurled portion 36 is formed at an end of the coupling head 10. The knurled portion 36 may be a straight knurl, for example. The knurled portion 36 is adapted to fit within the stem(s) 14, 40, 50 for anti-rotation and a fluid tight seal between the stem(s) 14, 40, 50 and the coupling head 10. In an embodiment, the knurled portion 36 is adapted to press fit within the stem(s) 14, 40, 50. Other suitable anti-rotation fittings for coupling heads and stems will be understood by one of skill in the art from the description herein.

Figure 4A:
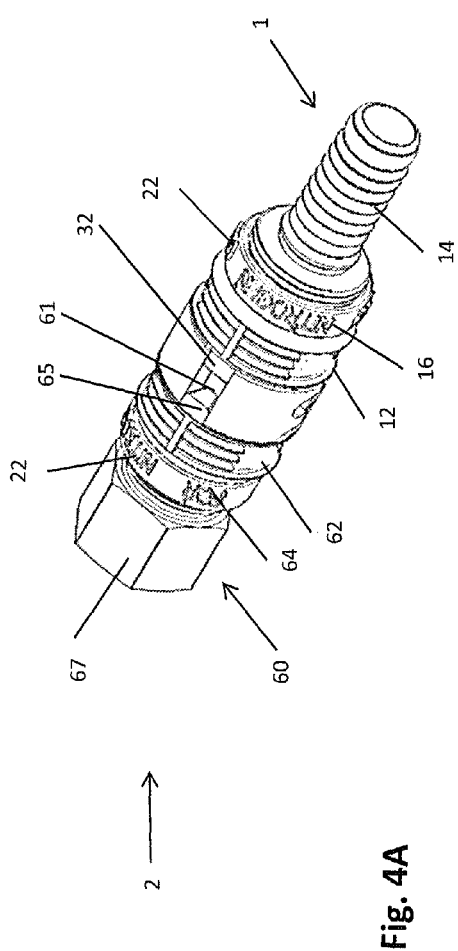
FIGS. 4A and 4B are isometric views of a double-lock style coupling, coupled and de-coupled according to aspects of the invention.
Figure 4B:
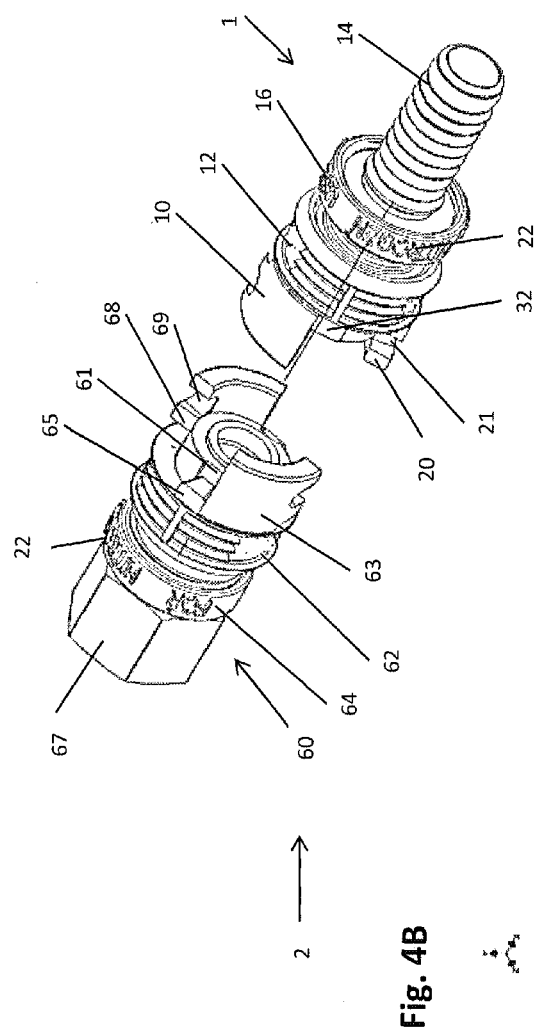

FIGS. 4A and 4B are isometric views of a double-lock style coupling according to aspects of the present invention. FIG. 4A shows a double lock coupling 2 in a locked and mated position and FIG. 4B shows a double lock coupling 2 in an unlocked and unmated position. The double lock coupling 2 includes the coupling 1 and the mating coupling 60. The coupling 1 includes a stem 14 that is a hose stem. The stem 14 may be a manifold stem as described in FIGS. 3A-3C. The mating coupling 60 includes a mate stem 67 that is a manifold stem configured to couple with a male NPT threaded coupling. The mate stem 67 may alternatively be a hose stem and/or a manifold configured to couple with a female NPT threaded coupling as described in FIGS. 3A-3C above. The coupling 1 has a coupling head 10 with recesses 21 configured to receive ears 68 on the head portion 63 of the mating coupling 60. The head portion 63 has recesses 69 configured to receive ears 20 on the coupling head 10 of the coupling 1.

In one embodiment, the mating coupling 60 includes a retractable locking sleeve 62 with axial projections 65, the retractable locking sleeve functioning substantially as described above with respect to retractable locking sleeve 12. When the coupling 1 and the mating coupling 60 are attached, the coupling head 10 and the head portion 63 form a channel 61 through which the axial projections 65 of retractable locking sleeve 62 and the axial projections 32 of retractable locking sleeve 12 protrude when both locking sleeves 62, 12 are in the locked position. The protrusion of axial projections 32, 65 through the channel 61 prevents the coupling head 10 and the head portion 63 from rotating with respect to and detaching from each other. When in the locked position, the axial projections 32, 65 of retractable locking sleeves 12, 62 may protrude fully or partially through the channel 61.

The coupling 1 may include a stem locking ring 16 as described above. In one embodiment, the mating coupling 60 includes a mate locking ring 64, the mate locking ring 64 functioning substantially as described above with respect to the stem locking ring 16. The mate locking ring 64 may be adapted to threadedly connect to a threaded portion on an outer surface of the mating coupling 60. In an embodiment, the mate locking ring 64 is positioned between the retractable locking sleeve 62 and the mate stem 67. The mate stem 67 may be a hose stem or a manifold stem. The mate locking ring 64 has a first position abutting a surface of the retractable locking sleeve 62 preventing movement of the retractable locking sleeve 62 to the unlocked position and a second position spaced apart from the retractable locking sleeve 62 permitting the retractable locking sleeve 62 to move to and from the locked and unlocked positions.

When both the mate locking ring 64 and the stem locking ring 16 are in the first positions respectively as shown in FIG. 4A, axial movement of the retractable locking sleeves 12, 62 is prevented, thus maintaining the retractable locking sleeves 12, 62 in the respective locked positions. In a particular embodiment, both the mate locking ring 64 and the stem locking ring 16 are in the respective second positions to permit the mating coupling 60 to attach to or detach from the coupling 1 as depicted in FIG. 4B. In a further embodiment, the mate locking ring 64 is moved between the first position and the second position by rotating the mate locking ring 64 in a direction opposite to the direction that the stem locking ring 16 is rotated to move the stem locking ring 16 between the first position and second position (e.g. the stem locking ring 16 is rotated clockwise and the mate locking ring 64 is rotated counterclockwise and vice versa). Other suitable rotation configurations for the locking rings will be understood by one of skill in the art from the description herein.

Figure 5C:
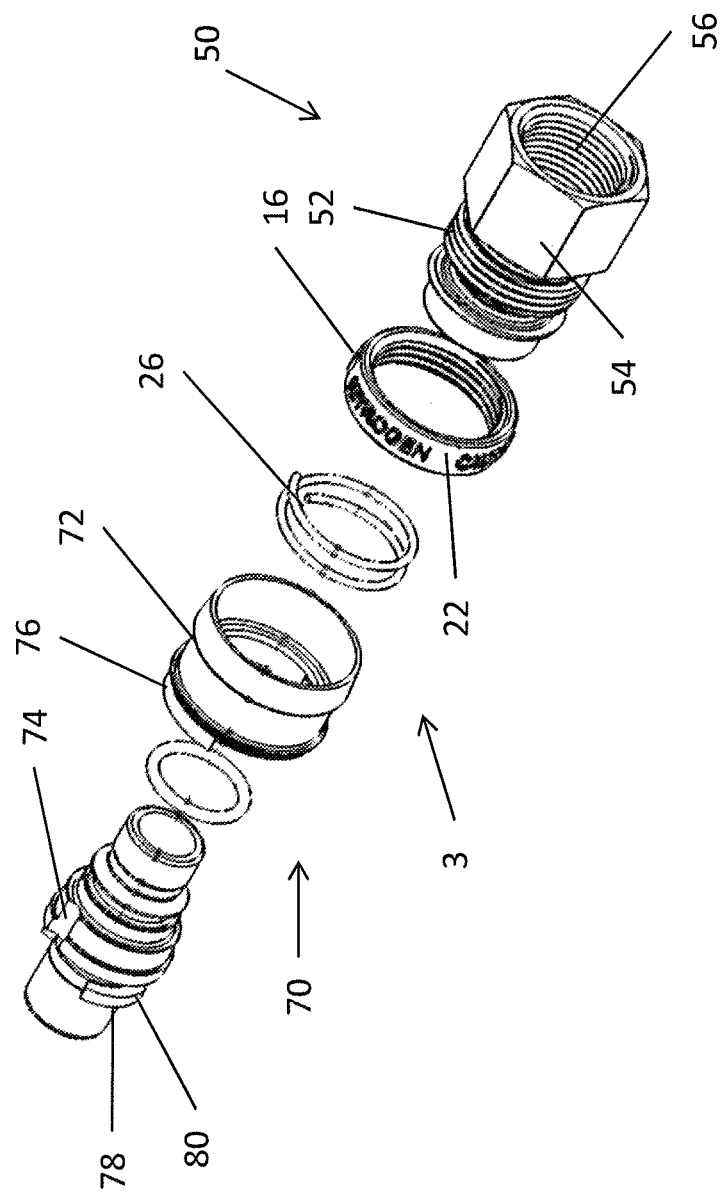

FIGS. 5A-5C depict isometric exploded views of a single-lock style coupling 3 according to aspects of the invention. The coupling 3 includes a coupling head 70 and a retractable locking sleeve 72. Disposed on the coupling head 70 are radial projections 78 configured to mate with respective receivers (not shown) of a mating coupling (not shown). The retractable locking sleeve 72 may include internal projections (not shown) disposed on the inner surface of the retractable locking sleeve 72. The internal projections may be configured to slide axially in grooves 74 formed on the outer surface of the coupling head 70 so as to prevent rotation of the retractable locking sleeve 72 with respect to the coupling head 70. A resilient element 26 (as described above) is disposed within the retractable locking sleeve 72 to facilitate axial movement of the retractable locking sleeve 72 to and from a locked and unlocked position. The retractable locking sleeve 72 includes axial projections 76 that each extend radially to about one-fourth of the circumference of the retractable locking sleeve 72.

When the retractable locking sleeve 72 is in the locked position, the axial projections 76 extend axially above the bottom surface 80 of the radial projections 78 of the coupling head 70 preventing the respective receivers from mating with and unmating from the radial projections 78, thus preventing the coupling head 70 from attaching to and detaching from a mating coupling. When the retractable locking sleeve 72 is in the unlocked position, the axial projections 78 slide axially below the bottom surface 80 of the radial projections 78 permitting the coupling head 70 to attach to and detach from a mating coupling. In one embodiment, the retractable locking sleeve 72 is moved from the locked position to the unlocked position by pushing the mating coupling to the coupling head 70.

The coupling 3 includes a stem that may be a hose stem 14 or a manifold 40, 50 as described above. A stem locking ring 16 (as described in FIGS. 1-48) may be configured to be threadedly connected to a threaded portion 18, 42, 52 on the outer surface of the stem 14, 40, 50. In an embodiment, the stem locking ring 16 has a first position abutting a surface of the retractable locking sleeve 72 preventing the retractable locking sleeve 72 from moving to the unlocked position and a second position spaced apart from the retractable locking sleeve 72 permitting the retractable locking sleeve 72 to move to and from the locked and unlocked positions.

The single-lock coupling 3 (as shown in FIGS. 5A-5C) may be locked with a mating coupling in accordance with aspects of the invention as described herein. The retractable locking sleeve 72 is moved axially to the unlocked position permitting the head portion of the mating coupling to attach to the coupling head 70. In attaching the mating coupling to the coupling head 70, the retractable locking sleeve 72 may be moved to the unlocked position by pressing the mating coupling to the coupling head 70. The head portion of the mating coupling is then attached to the coupling head 70. In an embodiment where the coupling head 70 includes radial projections 78, the head portion of the mating coupling is attached by rotating the coupling head 70 with respect to the mating coupling, thereby disposing the radial projections 78 into respective recesses in the mating coupling.

The retractable locking sleeve 72 is then released, causing the retractable locking sleeve 72 to move axially to the locked position. The resilient member 26 disposed within the retractable locking sleeve 72 pushes the retractable locking sleeve 72 axially toward the coupling head 70 when released. When moved into the locked position, the axial projections 76 of the retractable locking sleeve 72 extend above the bottom surface 80 of the radial projections 78 in the coupling head 70, preventing detachment of the mating coupling from the coupling head 70.

The stem locking ring 16 threadedly connected to the threaded portion 18 on the outer surface of the stem 14 is rotated to move axially from the second position spaced apart from the retractable locking sleeve 72 to the first position abutting the retractable locking sleeve 72. The stem locking ring 16 in the first position prevents axial movement of the retractable locking sleeve 72. The axial projections 76 on the retractable locking sleeve 72 remain above the bottom surface 80 of the radial projections 78 preventing the mating coupling from rotating and detaching from the coupling head 70. The retractable locking sleeve 72 cannot be moved axially to the unlocked position until the stem locking ring 16 is rotated to move axially to the second position.

The double-lock style coupling (as depicted in FIGS. 4A and 4B) may be locked with a mating coupling according to aspects of the invention. The retractable locking sleeves 12, 62 are moved axially to the respective unlocked positions. In attaching the mating coupling 60 to the coupling 1, the retractable locking sleeves 12, 62 may be moved to the unlocked positions by pushing the mating coupling 60 to the coupling 1. The head portion 63 of the mating coupling 60 is then attached to the coupling head 10. In an embodiment where the coupling head 10 includes ears 20 and recesses 21, the head portion 63 is attached to the coupling head 10 by rotating the head portion 63 and/or the coupling head 10 such that the ears 20 are inserted into recesses 69 and the ears 68 are inserted into recesses 21.

Once the head portion 63 is attached to the coupling head 10, the axial projections 32, 65 are substantially aligned along an axis and the resilient members disposed in the retractable locking sleeves 12, 62 biases the locking sleeves 12, 62 to the locked positions, disposing axial projections 32 and 65 through the channel 61 respectively.

The stem locking ring 16 is then rotated to move axially to the first position abutting the retractable locking sleeve 12, preventing the retractable locking sleeve 12 from moving to the unlocked position. The mate locking ring 64 may also be rotated to move axially to the first position of the mate locking ring 64 abutting the retractable locking sleeve 62, preventing the retractable locking sleeve 62 from moving to the unlocked position. In one embodiment, the stem locking ring 16 and the mate locking ring 64 are configured to be rotated in opposing radial directions to facilitate axial movement of the locking rings 16, 64. The axial projections 32, 65 remain disposed within the channel 61 so as to prevent rotation and detachment of the mating coupling 60 from the coupling 1.

The necessity for rotating the locking rings 16, 64 as described above for a single-lock style and double lock style couplings to move the locking rings 16, 64 axially to the respective second positions prior to attaching and/or detaching the coupling head(s) 10, 70 and the mating coupling(s) provides a user with an alert as to the media for which the coupling(s) 1, 2, 3 were intended as well as a locking mechanism in addition to the retractable locking sleeve(s) 12, 62, 72.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A stem coupling for use with a mating coupling, comprising:
   a coupling head configured to attach with a head portion of the mating coupling;
   a stem mated to the coupling head, the stem comprising a threaded portion on an outer surface thereof;
   a retractable locking sleeve positioned on a portion of the coupling head, the retractable locking sleeve having a locked position preventing the coupling head from attaching to or detaching from the mating coupling, and an unlocked position permitting the coupling head to attach to or detach from the mating coupling;
   wherein the coupling head further comprises at least one axial channel and the retractable locking sleeve further comprises at least one axial projection, the at least one projection disposed within a respective one of the at least one axial channel to prevent rotation of the coupling head with respect to the mating coupling; and
   a stem locking ring having internal threads threadedly connected to the threaded portion of the stem, the stem locking ring comprising a first surface that abuts a surface of the retractable locking sleeve in a first position of the stem locking ring to prevent axial movement of the retractable locking sleeve from the locked position to the unlocked position, and in a second position of the stem locking ring, the first surface is spaced apart from the retractable locking sleeve to permit axial movement of the retractable locking sleeve from the locked position to the unlocked position,
   wherein the stem locking ring further comprises at least one of a color and indicia to alert a user to a type of gas or liquid for which the stem coupling is intended.

2. The coupling of claim 1, wherein the stem locking ring further comprises both a color and indicia to alert a user to the type of gas or liquid for which the stem coupling is intended.

3. The coupling of claim 1, wherein the stem further comprises a staked portion positioned between the retractable locking sleeve and the threaded portion of the stem, a radius of the staked portion being less than a radius of the threaded portion of the stem.

4. A combination of the stem coupling of claim 1 and the mating coupling, the combination further comprising a mate locking ring having internal threads threadedly connected to a threaded portion on an outer surface of the mating coupling, the mate locking ring having a first surface abutting a second retractable locking sleeve in a first position of the mate locking ring to prevent axial movement of the second retractable locking sleeve from a locked position to an unlocked position, and in a second position of the mate locking ring, the first surface of the mate locking ring is spaced apart from the second retractable locking sleeve to permit axial movement of the second retractable locking sleeve from the locked position to the unlocked position; and
   wherein the second retractable locking sleeve is positioned on a portion of the mating coupling.

5. The combination of claim 4, wherein the mate locking ring further comprises at least one of a color and indicia to alert a user to the type of gas or liquid for which the mating coupling is intended.

6. The coupling of claim 1, further comprising an O-ring positioned between the coupling head and the stem for sealing pressure between the coupling head and the stem.

7. The coupling of claim 1, wherein the coupling head has formed therein radial projections adapted to mate with respective recesses formed in the mating coupling.

8. A stem coupling for use with a mating coupling, comprising:
   a coupling head configured to attach with a head portion of the mating coupling;

a stem mated to the coupling head, the stem comprising a threaded portion on an outer surface thereof;

wherein the coupling head further comprises a knurled portion adapted for press fit within the stem at a first end thereof;

a retractable locking sleeve positioned on a portion of the coupling head, the retractable locking sleeve having a locked position preventing the coupling head from attaching to or detaching from the mating coupling, and an unlocked position permitting the coupling head to attach to or detach from the mating coupling; and a stem locking ring having internal threads threadedly connected to the threaded portion of the stem, the stem locking ring comprising a first surface that abuts a surface of the retractable locking sleeve in a first position of the stem locking ring to prevent axial movement of the retractable locking sleeve from the locked position to the unlocked position, and in a second position of the stem locking ring, the first surface is spaced apart from the retractable locking sleeve to permit axial movement of the retractable locking sleeve from the locked position to the unlocked position, wherein the stem locking ring further comprises at least one of a color and indicia to alert a user to a type of gas or liquid for which the stem coupling is intended.

9. A method of assembling a stem coupling, the method comprising:

mating a coupling head to a stem, wherein the stem comprises a threaded portion on an outer surface thereof;

positioning a retractable locking sleeve on the coupling head, wherein the retractable locking sleeve comprises a locked position preventing the coupling head from attaching to or detaching from a mating coupling and an unlocked position permitting the coupling head to attach to or detach from the mating coupling;

disposing at least one axial projection of the retractable locking sleeve within at least one axial channel to prevent rotation of the coupling head with respect to a mating coupling; and threadedly connecting a stem locking ring having internal threads to the threaded portion of the stem, wherein the stem locking ring is movable between a first position and a second position, i) wherein, in the first position of the stem locking ring, a first surface of the stem locking ring abuts a surface of the retractable locking sleeve to prevent axial movement of the retractable locking sleeve from the locked position to the unlocked position, and ii) wherein, in the second position of the stem locking ring, the first surface of the stem locking ring is spaced apart from the locking sleeve to permit axial movement of the retractable locking sleeve from the locked position to the unlocked position, and wherein the stem locking ring further comprises at least one of a color and indicia to alert a user of a type of gas or liquid for which the stem coupling is intended.

10. The method of claim 9, wherein the stem locking ring further comprises both a color and indicia to alert a user to the type of gas or liquid for which the stem coupling is intended.

11. The method of claim 9, further comprising staking a portion of the stem between the retractable locking sleeve and the threaded portion of the stem such that the staked portion has a radius less than a radius of the threaded portion of the stem.

12. The method of claim 9, further comprising forming a knurled portion of the coupling head at a first end thereof, said knurled portion adapted for press fit within the stem; and press-fitting the knurled portion within the stem.

* * * * *

UNITED STATES PATENT AND TRADEMARK OFFICE
CERTIFICATE OF CORRECTION

PATENT NO. : 9,334,995 B2
APPLICATION NO. : 14/075181
DATED : May 10, 2016
INVENTOR(S) : Kremer et al.

Page 1 of 1

It is certified that error appears in the above-identified patent and that said Letters Patent is hereby corrected as shown below:

In the specification,

At Column 3, line 23, "FIG. 3A-3C" should read -- FIGS. 3A-3C --.

At Column 6, line 37, "FIGS. 1-48" should read -- FIGS. 1-4B --.

Signed and Sealed this
Second Day of August, 2016

Michelle K. Lee
*Director of the United States Patent and Trademark Office*